United States Patent
Tanase et al.

(10) Patent No.: US 7,754,640 B2
(45) Date of Patent: Jul. 13, 2010

(54) MAGNESIUM COMPOUND, SOLID CATALYST COMPONENT, CATALYST FOR ETHYLENE POLYMERIZATION AND METHOD OF PRODUCING ETHYLENE POLYMER

(75) Inventors: Shojiro Tanase, Ichihara (JP); Hideaki Noda, Ichihara (JP); Kiyokazu Katayama, Ichihara (JP); Takehito Konakazawa, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 151 days.

(21) Appl. No.: 11/816,587

(22) PCT Filed: Apr. 11, 2006

(86) PCT No.: PCT/JP2006/307640

§ 371 (c)(1),
(2), (4) Date: Aug. 17, 2007

(87) PCT Pub. No.: WO2006/115040

PCT Pub. Date: Nov. 2, 2006

(65) Prior Publication Data

US 2009/0203857 A1    Aug. 13, 2009

(30) Foreign Application Priority Data

Apr. 18, 2005 (JP) .............................. 2005-119391

(51) Int. Cl.
*B01J 31/00* (2006.01)
*B01J 37/00* (2006.01)
*C08F 110/02* (2006.01)

(52) U.S. Cl. .............. 502/103; 502/104; 502/132; 526/352

(58) Field of Classification Search ............ 502/9, 502/111, 118, 119, 121, 122, 123, 124, 125, 502/126, 127, 128, 171
See application file for complete search history.

(56) References Cited

U.S. PATENT DOCUMENTS 4,663,299 A * 5/1987 Chadwick et al. ............. 502/9

(Continued)

FOREIGN PATENT DOCUMENTS

EP    0 216 402 A2    4/1987

(Continued)

OTHER PUBLICATIONS

U.S. Appl. No. 12/408,926, filed Mar. 23, 2009, Tanase, et al.

*Primary Examiner*—David Wu
*Assistant Examiner*—Elizabeth Eng
(74) *Attorney, Agent, or Firm*—Oblon, Spivak, McClelland, Maier & Neustadt, L.L.P.

(57) ABSTRACT

A magnesium compound obtainable by reacting metal magnesium, ethanol, an alcohol having from 3 to 10 carbon atoms and a halogen and/or a halogen-containing compound containing at least 0.0001 gram atom of a halogen atom relative to one gram atom of the metal magnesium at 0 to 70° C., which comprises composition represented by the formula (I), and which has a particle diameter $D_{50}$ corresponding to 50% of cumulative weight fraction of from 4 to 20 μm and a particle size distribution index (P) of P<4.0:

$$Mg(OC_2H_5)_{2-n}(OR^1)_n \qquad (I)$$

where n is a numerical value satisfying 0<n<0.35, $R^1$ is $C_mH_{2m+1}$, and m is an integer of from 3 to 10.

9 Claims, 2 Drawing Sheets

U.S. PATENT DOCUMENTS

2004/0198589 A1* 10/2004 Tanase et al. ............... 502/103
2007/0213206 A1  9/2007 Tanase et al.

FOREIGN PATENT DOCUMENTS

| | | |
|---|---|---|
| EP | 1 108 730 A1 | 6/2001 |
| EP | 1 739 070 A1 | 1/2007 |
| JP | 5 1112 | 1/1993 |
| JP | 9 194522 | 7/1997 |
| WO | 03 099749 | 12/2003 |
| WO | 2005 102973 | 11/2005 |

* cited by examiner

(A) Solid catalyst component (a) Mg compound
- Metal Mg
- Ethanol
- Alcohol with 3 to 10 carbon atoms
- Halogen/halogen-containing compound
  Halogen ≥ 0.0001 gram atoms $Mg(OC_2H_5)_{2-n}(OR^1)_n \cdots \cdots (I)$ where n is a numerical value satisfying $0 < n < 0.35$, $R^1$ is $C_mH_{2m+1}$, and m is an integer of from 3 to 10
Reaction temperature: 0 to 70°C
$4 < D_{50} < 20$ μm
$P < 4.0$ (b) Ti compound ((c) Halide)

((d) Alcohol)

Solid catalyst component for ethylene polymer (B) Organoaluminum compound

Catalyst for ethylene polymerization

US 7,754,640 B2

MAGNESIUM COMPOUND, SOLID CATALYST COMPONENT, CATALYST FOR ETHYLENE POLYMERIZATION AND METHOD OF PRODUCING ETHYLENE POLYMER

TECHNICAL FIELD

The invention relates to a magnesium compound, solid catalyst component and catalyst for ethylene based polymerization (referred to as "ethylene polymerization"), useful for ethylene homopolymerization and copolymerization of ethylene and an α-olefin, and a method of producing the homopolymers and copolymers thereof.

TECHNICAL BACKGROUND

Hitherto, ethylene homopolymers or copolymers of ethylene and α-olefins have been widely industrially produced with a Ziegler Natta catalyst containing a Ti compound and magnesium compound.

Magnesium chloride and magnesium dialkoxide were used as a support of the catalyst system. In view of process constraints (e.g., powder fluidized drying efficiency) or improvements in catalyst activity and film appearance (e.g., reducing foreign bodies, so-called fish eyes or gel in film) (JP-A-H9-194522), the technique has been widely carried out that the support is mechanically pulverized for use. However the pulverization of support increases an amount of fine powder in polymer powder, which reflects the properties of support particles. The increase causes the trouble of blocking a powder transport line. Further the powder flowability decreases due to the bad powder form, thereby letting a reactor of polymerization unstable.

In view of the above, the invention was made and an object of the invention is to provide a magnesium compound, solid catalyst component, catalyst for ethylene polymerization, and a method of producing an ethylene polymer yielding an ethylene polymer excellent in particle size distribution and flowability of polymer powder without imparting the basic catalyst performance such as activity, hydrogen sensitivity and film appearance.

DISCLOSURE OF THE INVENTION

The inventors found through an intensive study that the object can be attained by a catalyst for ethylene polymerization containing an organoaluminum and a solid catalyst component obtainable by using a particular magnesium compound to complete the invention.

The invention provides the following magnesium compound, solid catalyst component, catalyst for ethylene polymerization and method of producing an ethylene based polymer (referred to as "ethylene polymer").

(1) A magnesium compound obtainable by reacting metal magnesium, ethanol, an alcohol having from 3 to 10 carbon atoms and at least one of a halogen and a halogen-containing compound containing at least 0.0001 gram atom of a halogen atom relative to one gram atom of the metal magnesium at 0 to 70° C., which has composition represented by the formula (I), and which has a particle diameter $D_{50}$ corresponding to 50% of cumulative weight fraction of from 4 to 20 μm and a particle size distribution index (P) represented by the formula (I) of P<4.0:

$$Mg(OC_2H_5)_{2-n}(OR^1)_n \qquad (I)$$

where n is a numerical value satisfying $0<n<0.35$, $R^1$ is $C_mH_{2m+1}$, and m is an integer of from 3 to 10, $$P=(D_{90}/D_{10}) \qquad (1)$$

where $D_{90}$ is a particle diameter corresponding to 90% of cumulative weight fraction, and $D_{10}$ is a particle diameter corresponding to 10% of cumulative weight fraction.

(2) The magnesium compound according to (1), wherein the alcohol having from 3 to 10 carbon atoms is n-butanol.

(3) The magnesium compound according to (1) or (2), wherein the halogen is iodine.

(4) The magnesium compound according to any one of (1) to (3), wherein the halogen-containing compound is $MgCl_2$.

(5) The magnesium compound according to any one of (1) to (4), wherein n is a numeral value of from 0.005 to 0.3 in the formula (I).

(6) A solid catalyst component for ethylene polymerization obtainable by reacting the following components (a) and (b):

(a) the magnesium compound according to any one of (1) to (5)

(b) a titanium compound represented by the following formula (II)

$$Ti(OR^2)_sX_{4-s} \qquad (II)$$

where X is a halogen atom, $R^2$ is a hydrocarbon group having from 1 to 10 carbon atoms, $R^2$s may be the same or different, and s is an integer of from 0 to 4.

(7) The solid catalyst component for ethylene polymers according to (6) obtainable by reacting a halogen compound (c) in addition to the components (a) and (b).

(8) The solid catalyst component for ethylene polymers according to (7) wherein the halogen compound (c) is silicon tetrachloride.

(9) The solid catalyst component for ethylene polymers according to (7) or (8) obtainable by reacting the components (a), (b), (c) and an alcohol (d).

(10) The solid catalyst component for ethylene polymers according to (9) wherein the alcohol (d) is isopropanol.

(11) A catalyst for ethylene polymerization comprising the following components (A) and (B):

(A) the solid catalyst component according to any one of (7) to (10)

(B) an organoaluminum compound.

(12) A method of producing an ethylene homopolymer or a copolymer of ethylene and an α-olefin using the catalyst for ethylene polymerization according to (11).

The invention can provide a catalyst for ethylene polymerization excellent in polymer powder performance and film appearance with a high activity and good hydrogen sensitivity, and a method of producing an ethylene polymer by using a particular magnesium compound.

BEST MODE FOR CARRYING OUT THE INVENTION

The method of producing ethylene polymerization of the invention uses a catalyst including a solid catalyst component (A) and an organoaluminum component (B).

Each catalyst component, preparing method, polymerization method and so on will be described below.

[I] Respective Catalyst Components (A) Solid Catalyst Components

The solid catalyst component is obtainable by reacting the following magnesium compound (a), titanium compound (b), and if necessary, halide (c), and if further necessary, alcohol (d).

(a) Magnesium Compound

The magnesium compound of the invention is obtainable by reacting metal magnesium, ethanol, an alcohol having from 3 to 10 carbon atoms and a halogen and/or a halogen-containing compound containing at least 0.0001 gram atom of a halogen atom relative to one gram atom of the metal magnesium at 0 to 70° C., which has a composition represented by the formula (I), $$Mg(OC_2H_5)_{2-n}(R^1)_n \quad (I)$$

where n is a numerical value satisfying $0<n<0.35$, $R^1$ is $C_mH_{2m+1}$, and m is an integer of from 3 to 10.

In the invention, the magnesium compound (a) is used as a support for the solid catalyst component for ethylene polymerization (A). The support may substantially consist of the magnesium compound (a) of the formula (I).

Here, the term "substantially" means that not only the case where the support consists purely of the magnesium compound of $Mg(OC_2H_5)_{2-n}(OR^1)_n$, but also the case where the support additionally contains infinitesimal impurities (for instance, a case where an alcohol complex of a magnesium halide such as $MgI_2$ adheres to the support surface, which the plate crystallizations of $Mg(OC_2H_5)_{2-n}(OR^1)_n$ aggregate to let to be nearly spherical shape, and the like) are included. In the invention, even though the impurities are contained, when the purity of $Mg(OC_2H_5)_{2-n}(OR^1)_n$ at least 95%, it can be used as the support. Preferred purity is at least 98%, more preferred purity is at least 99%.

n is preferably from 0.005 to 0.3.

$R^1$ as represented by $C_mH_{2m+1}$ is preferably n-$C_3H_7$, n-$C_4H_9$, n-$C_5H_{11}$, n-$C_6H_{13}$, n-$C_7H_{15}$ and n-$C_8H_{17}$.

The alcohols having from 3 to 10 carbon atoms used in the invention include n-propanol, i-propanol, n-butanol, sec-butanol, i-butanol, t-butanol, 3-methylbutanol, n-pentanol, cyclopentanol, 2-methylpentanol, 3-methylpentanol, n-hexanol, and cyclohexanol. Preferred alcohols include n-propanol, n-butanol, n-pentanol, n-hexanol, n-heptanol, and n-octanol. Particularly preferred is n-butanol.

Although purity and water content of the ethanol and the alcohol having from 3 to 10 carbon atoms are not particularly limited, when using alcohol having high water content, magnesium hydroxide is formed on the surface of the metal magnesium; therefore, the alcohol having water content of 1% or below, particularly 2,000 ppm or below is preferably used. Further, in order to attain better morphology, the lesser the water content is, the more preferred it is, and generally, the alcohol having water content of 200 ppm or below is desired.

Although the total amount of ethanol and alcohol having from 3 to 10 carbon atoms are not particularly limited, it is used preferably in an amount of from 2 to 100 mole relative to one mole of the metal magnesium, particularly preferably in an amount of from 5 to 50 mole. When the amount of alcohol is too large, the yield of the magnesium compound (a) having good morphology may be reduced, and when the amount of alcohol is too small, smooth agitation in a reaction vessel may not be possible. However, it is not limited to the molar ratio.

Although the kinds of the halogen are not particularly limited, chlorine, bromine or iodine, particularly iodine is preferred. The kinds of the halogen-containing compound are not limited, and any compound containing a halogen atom may be used. In this case, although the kinds of the halogen atom are not particularly limited, chlorine, bromine or iodine is preferred. Among the halogen-containing compounds, halogen-containing metal compounds are particularly preferred. As the halogen-containing compound, specifically, $MgCl_2$, $MgI_2$, $Mg(OC_2H_5)Cl$, $Mg(OC_2H_5)I$, $MgBr_2$, $CaCl_2$, NaCl, KBr and the like are suitably used. Of these, $MgCl_2$ is particularly preferred. The state, shape, granularity and the like of the halogen-containing compound are not particularly limited, any compound may be used, for instance, it may be used in the state of the solution in an alcohol solvent (for example, ethanol).

The amount of the halogen or the halogen-containing compound as a halogen atom per mole of the metal magnesium is 0.0001 gram atom or more, preferably 0.0005 gram atom or more, more preferably 0.001 gram atom or more of a halogen atom. When the amount of the halogen is less than 0.0001 gram atom, there is no difference from a case where halogen is used as a reaction initiator, and when the magnesium compound (a) obtained is used as a catalyst support, the catalyst may be poor in catalyst activity or a produced polymer may be defective in morphology and the like. While the upper limit of the amount(s) of the halogen and/or the halogen-containing compound is not specially limited, the upper limit may be appropriately selected so long as the desired magnesium compound (a) can be obtained. Generally, the above upper limit is set to less than 0.06 gram atom.

In the invention, the halogens or the halogen-containing compounds may be used individually or in a combination of two or more halogens or halogen-containing compounds. Further, the halogen and the halogen-containing compound may be used in combination. When two or more kinds of the halogen and the halogen-containing compound are used in combination, the amount of total halogen atoms is the same as the above.

A reaction of a metal magnesium, alcohol, halogen and/or halogen-containing compound can be carried out by a known method except that the reaction is carried out at 0 to 70° C. using ethanol and an alcohol having from 3 to 10 carbon atoms in combination as the alcohol. A magnesium compound is obtained by reacting until no more hydrogen gas is generated (usually 10 to 30 hours are needed.)

Specifically, when using iodine as the halogen, such that iodine in a solid state is added into the alcohol solution of the metal magnesium, and then, followed by reaction with heat; that the alcohol solution of iodine is dropwise added to the alcohol solution of the metal magnesium, followed by heating; or that while heating the alcohol solution of the metal magnesium, the alcohol solution of iodine is dropwise added to the alcohol solution of the metal magnesium, followed by reaction.

Each method is preferably carried out in the atmosphere of an inert gas (e.g., nitrogen gas or argon gas) and optionally in the presence of an inert organic solvent (e.g., saturated hydrocarbon such as n-hexane).

It is not required to charge the entire amount of each of the metal magnesium, the alcohol and the halogen at once from the beginning, and they may be divided and partially charged. In a particularly preferred embodiment, the alcohol is entirely charged in the beginning, the metal magnesium is divided into several portions and such portions are charged separately. In this embodiment, the generation of a large amount of hydrogen gas can be prevented, which is desirable in view of safety. Further, the size of a reaction vessel can be decreased. Further, it is also made possible to prevent the dissipation of alcohol and halogen caused by the momentary generation of a large amount of hydrogen gas. While the number of the divisional portions can be determined by taking account of the size of the reaction vessel and is not specially limited, suitably, each is generally divided into five to ten portions in view of complicatedness of procedures.

Further, the reaction may be carried out by any one of a batch method and a continuous method. Further, there may be employed a variant method in which the entire amount of the alcohol is charged in the beginning, a small amount of the metal magnesium is added to the alcohol, a product formed by a reaction is removed by separating it into other vessel, then, a small amount of the metal magnesium is charged, and these procedures are repeated.

In the invention, it is important to carry out the above-mentioned reaction at 0 to 70° C., preferably at 20 to 50° C. When the temperature is higher than that, the particle size distribution of the magnesium compound becomes broad. When it is lower, the reactivity of the alcohol having from 3 to 10 carbon atoms decreases to give a defective shape. The advantageous effects of the invention are hardly exhibited, it being undesirable.

It is important to control the composition of the magnesium compound obtainable by the above-mentioned reaction within a range of $0<n<0.35$ in formula (I). When the composition does not fall within the range, the nature of the magnesium compound approximates to that of magnesium diethoxide or a magnesium dialcoxide having from 3 to 10 carbon atoms and the advantageous effects of the invention are hardly exhibited, it being undesirable.

In order to control the composition in a range of $0<n<0.35$, the reaction is carried out at 0 to 70° C. at a molar ratio of an alcohol having from 3 to 10 carbon atoms to ethanol of from 0.001 to 0.3.

In the invention, when the magnesium compound (a) is produced, it is possible to control the particle diameter freely by selecting the amount of the halogen and/or halogen-containing compound. The magnesium compound (a) of the invention preferably has an average particle diameter $D_{50}$ ($D_{50}$ is a particle diameter corresponding to 50% of cumulative weight fraction) of from 4 to 20 µm and more preferably from 5 to 10 µm.

A particle diameter distribution index (P) represented by the following formula of the magnesium compound (a) of the invention is preferably P<4.0, and more preferably P<3.5.

$$P=(D_{90}/D_{10})$$

where $D_{90}$ is a particle diameter corresponding to 90% of cumulative weight fraction, and $D_{10}$ is a particle diameter corresponding to 10% of cumulative weight fraction.

In order to make the particle size distribution index (P) less than 4.0, the reaction is carried out at 0 to 70° C. at a molar ratio of an alcohol having from 3 to 10 carbon atoms to ethanol of from 0.001 to 0.3.

The magnesium compound (a) preferably has a smoothness (Sm) represented by the following formula of less than 1.20.

$$Sm=(L^1/L^2)^3$$

where $L^1$ is a circumferential length of a projection view of a magnesium compound particle determined by photographing with a scanning electron microscope and thereafter an image-processing, and $L^2$ is a circumferential length of an ellipse which has an area equal to the projection area of the magnesium compound particle and which is approximated to the outline of the magnesium compound particle such that when the magnesium compound particle is wrapped over the ellipse, the sum of the areas inside and outside the outline of the ellipse among the sections surrounded by the outline of the magnesium compound particle and the outline of the ellipse becomes minimum.

Figure 1:
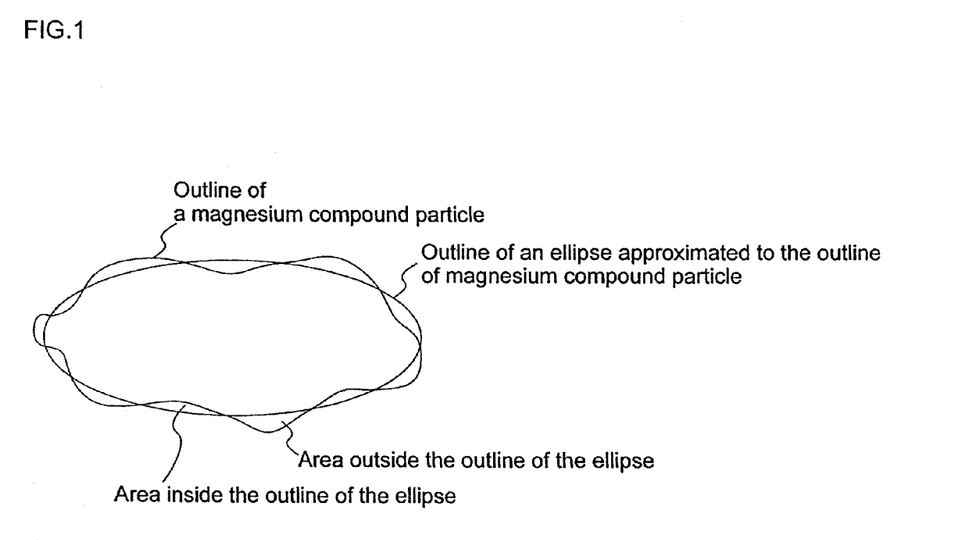
FIG. 1 is a drawing which shows one example of the ellipse approximated to the magnesium compound particle of the invention.
Figure 2:
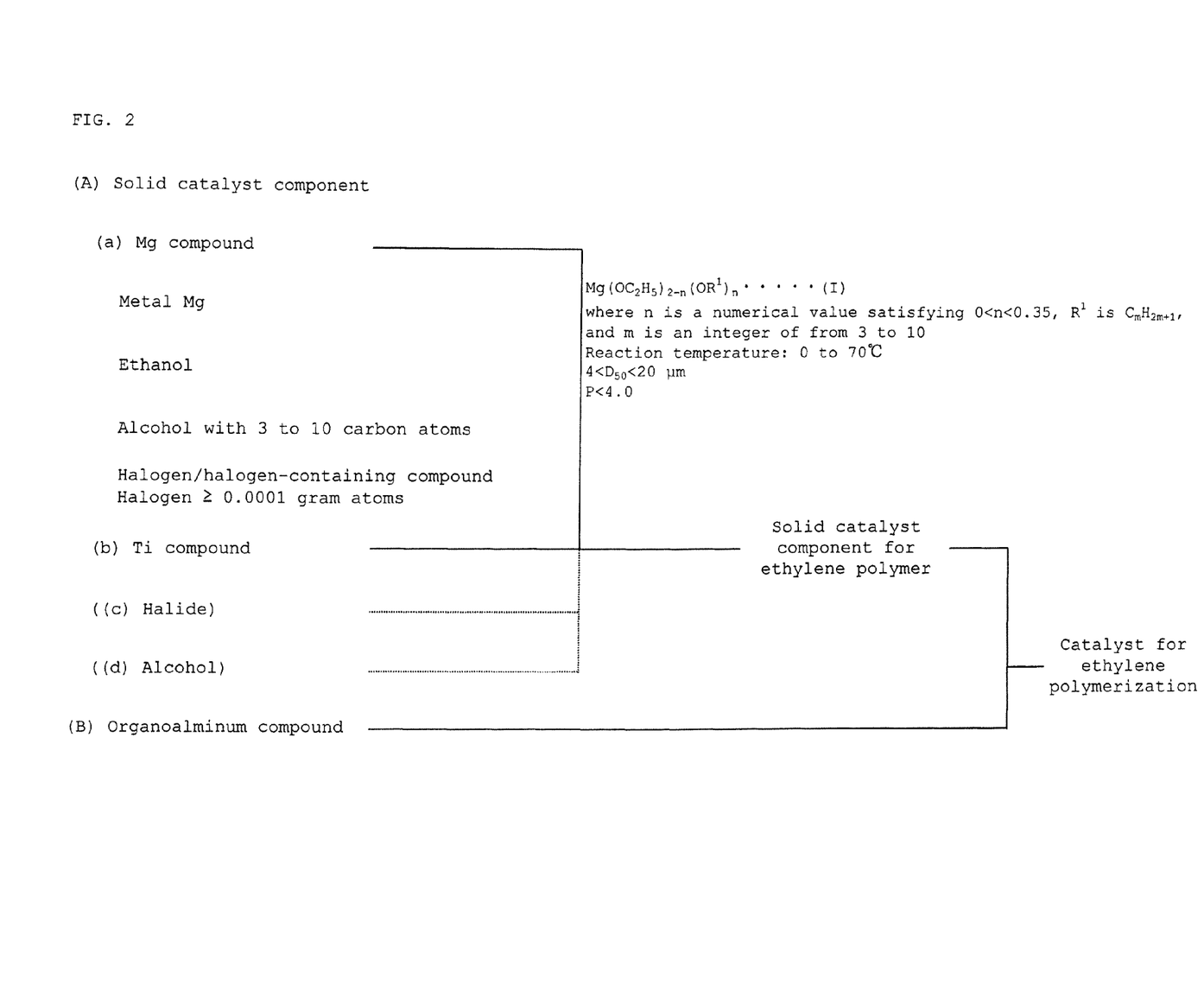
FIG. 2 is a drawing which shows a method of producing a catalyst for ethylene polymerization of the invention.

One example of the ellipse approximated to the magnesium compound (a) is shown in FIG. 1.

In order to make the smoothness less than 1.20, in the production of the magnesium compound (a), the reaction is carried out at 0 to 70° C. at a molar ratio of an alcohol having from 3 to 10 carbon atoms to ethanol of 0.001 to 0.3.

When using the magnesium compound (a) obtained for the next transition metal compound (A) production, the dried compound or the compound washed with an inert solvent such as heptane after filtration may be used. In each case, the magnesium compound (a) obtained can be used in the following steps without subjecting it to pulverization or classification for uniformizing the particle size distribution. Further, the magnesium compound (a) has a nearly spherical shape, a sharp particle size distribution and a small sphericity variation among the particles.

The magnesium compound may be used individually or in a combination of two kinds or more. Further, it may be used in the state supported on a support such as silica, alumina or polystyrene, and as a mixture with a halogen or the like.

(b) Titanium Compound

Although not specially limited, the compound represented by the general formula (II) can be preferably used $$Ti(OR^2)_sX_{4-s} \tag{II}$$

where X is a halogen atom, $R^2$s may be the same or different and $R^2$ is a hydrocarbon group having from 1 to 10 carbon atoms, s is an integer of from 0 to 4.

In the above general formula (II), X denotes a halogen atom, and of halogen atoms, preferred is a chlorine atom or a bromine atom and particularly preferred is a chlorine atom.

$R^2$ denotes a hydrocarbon group, which may be a saturated group or an unsaturated group, which may have a straight chain, branched chain or cyclic structure. As $R^2$, an alkyl group, an alkenyl group, a cycloalkenyl group, an aryl group, an aralkyl group and the like are preferred, and a straight chain or branched chain alkyl group is particularly preferred. When a plurality of groups as —$OR^2$ are present, they may be the same as, or different from, each other. Specific examples of $R^2$ include methyl, ethyl, n-propyl, isopropyl, n-butyl, sec-butyl, isobutyl, n-pentyl, n-hexyl, n-heptyl, n-octyl, n-decyl, allyl, butenyl, cyclopentyl, cyclohexyl, cyclohexenyl, phenyl, tolyl, benzyl and phenethyl.

s is preferably an integer of from 0 to 2, and more preferably from 0 to 1.

Specific examples of the halogen-containing titanium compounds of the above-mentioned general formula (II) include tetraalkoxy titanium such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, and tetraphenoxytitanium; titanium tetrahalides such as titanium tetrachloride, titanium tetrabromide and titanium tetraiodide; alkoxytitanium trihalides such as methoxytitanium trichloride, ethoxytitanium trichloride, propoxytitanium trichloride, n-butoxytitanium trichloride and ethoxytitanium tribromide; dialkoxytitanium dihalides such as dimethoxytitanium dichloride, diethoxytitanium dichloride, diisopropoxytitanium dichloride, di-n-propoxytitanium dichloride and diethoxytitanium dibromide; and trialkoxytitanium monohalides such as trimethoxytitanium chloride, triethoxytitanium chloride, triisopropoxytitanium chloride, tri-n-propoxytitanium chloride and tri-n-butoxytitanium chloride. Of these, high-halogenated titanium compounds are preferred, and titanium tetrachloride is particularly preferred, in view of polymerization activity. These halogen-containing titanium compounds may be used individually or in combination of two or more compounds.

(c) Halide

In the invention, a halide is used if necessary. The halide includes silicon tetrachloride, silicon tetrabromide, tin tetrachloride and hydrogen chloride, and of these, silicon tetrachloride is particularly preferred. These halides may be used individually or as a combination of two or more halides.

(d) Alcohol

In the invention, if necessary, alcohol (d) is employed. A linear or branched aliphatic alcohol or an aliphatic cyclic alcohol may be employed. Specific examples include methanol, ethanol, propanol, isopropanol, butanol, isobutanol, amylalcohol, octanol and cyclopentanol. Of these, isopropanol is particularly preferred.

(B) Organoaluminum Compound

Although not specially limited, the organoaluminum compound (B) can be preferably selected from an organoaluminum compound having an alkyl group, a halogen atom, a hydrogen atom and an alkoxy group, aluminoxane, or a mixture of these. Specific examples thereof include trialkylaluminum compounds such as trimethylaluminum, triethylaluminum, triisopropylaluminum, triisobutylaluminum and trioctylaluminum; dialkylaluminum monochlorides such as diethylaluminum monochloride, diisopropylaluminum monochloride, diisobutylaluminum monochloride and dioctylaluminum monochloride; alkylaluminum sesquihalides such as ethylaluminum sesquichloride; and linear aluminoxanes such as methylaluminoxane. Of these organoaluminum compounds, trialkylaluminum having a lower alkyl group having 1 to 5 carbon atoms is preferred, and trimethylaluminum, triethylaluminum, tripropylaluminum and triisobutylaluminum are particularly preferred. These organoaluminum compounds may be used individually, or two or more thereof may be used in combination.

[II] Preparation of Solid Catalyst Component

As a method of preparing the solid catalyst component (A), magnesium compound (a), titanium compound (b), and, if necessary, the halide (c) and, if necessary, the alcohol (d) may be brought into contact and react with each other. Further, these compounds are preferably brought into contact and react with each other in the amounts thereof under the condition with the operations as follows:

When the solid catalyst component is obtained by using the magnesium compound and the titanium compound, the magnesium compound is dispersed in an inert solvent. Any inert solvent that is inert to the magnesium compound and the solid catalyst component may be used, for example, various solvents such as aliphatic hydrocarbons, alicyclic hydrocarbons and aromatic hydrocarbons can be used. Specifically preferred are butane, pentane, hexane, heptane, octane cyclohexane, toluene, ethylbenzene and the like. The amount of the magnesium compound is not particularly limited, but it is preferably 50 to 500 g relative to one liter of a solvent in view of handling conveniences.

Next the titanium compound is added to this dispersed system, and then reacted at a temperature of from 0 to 200° C., preferably from 50 to 150° C. with stirring under a pressure of atmospheric pressure or compression. The titanium compound is generally added in a molar amount equal to or more than that of the magnesium compound, specifically preferably 1 to 20 times or more the molar amount thereof, particularly preferably 1.5 to 10 times the molar amount thereof. The reaction time is generally 5 minutes to 10 hours, preferably 30 minutes to 8 hours, depending on reaction temperature.

When the solid catalyst component is obtained by contacting the magnesium compound, the titanium compound, the halogen compound and, if necessary, the alcohol, the magnesium compound is dispersed in an inert solvent. The above-mentioned inert solvents may be used. Next the halogen compound and, if necessary, the alcohol are reacted with the dispersed system at a certain temperature for a certain period of time under stirring to modify the magnesium compound. The halogen compound is generally added at a ratio of halogen/magnesium (atom ratio) of 1.5 or less, preferably 0.2 to 1.5, particularly preferably 0.5 to 1.5. If the ratio is out of the range, the activity, hydrogen sensitivity and powder form may be disadvantageously degraded. The alcohol is generally added at a ratio of OH/magnesium (atom ratio) of 0.1 or more. The upper limit thereof is not particularly limited but the use in a large amount is the waste of alcohol. Thus the upper limit of OH/alcohol (atom ratio) is generally 1. In the case where the amount of alcohol used is less than this limit, polymerization activity and apparent density of polymer may not be enhanced.

The reaction temperature is generally 0 to 150° C., preferably 20 to 100° C. The reaction time is generally 5 minutes to 5 hours, preferably 30 minutes to 3 hours, depending on reaction temperature. The contact order of the compounds in the above reaction is not important. For example, the components may be contact with each other in the presence of an inert solvent such as hydrocarbons. Alternatively the components each are diluted with an inert solvent such as hydrocarbons in advance and then contacted.

After modifying the magnesium compound, a titanium compound is further added and reacted with stirring at 0 to 200° C., preferably 50 to 150° C. under a pressure of atmosphere or compression. The titanium compound is generally added in a molar amount equal to or more than that of the magnesium compound, preferably an excessive amount, specifically 1 to 20 times or more the molar amount thereof, particularly preferably 1.5 to 10 times the molar amount thereof. The reaction time is generally 5 minutes to 10 hours, preferably 30 minutes to 8 hours, depending on reaction temperature.

After the above reaction, a solid catalyst component is separated from the reaction product and washed. Any washing solvent that is inert to the solid catalyst component may be used, various solvents such as aliphatic hydrocarbons, alicyclic hydrocarbons and aromatic hydrocarbons can be used. Specifically preferred are butane, pentane, hexane, heptane, octane cyclohexane, toluene, ethylbenzene and the like. Further, although the washing method is not particularly limited, methods such as decantation and filtration are preferred. Although the amount of the inert solvent used, washing period of time and number of washing times are also not particularly limited, the solvent is usually used in an amount of from 100 to 100,000 mL, preferably from 1,000 to 50,000 mL relative to one mole of the magnesium compound, and the contact is usually carried out for one minute to 24 hours, preferably for 10 minutes to 6 hours. When the ratio of the solvent is outside the above-mentioned range, the washing may not be completely carried out. Although pressure at washing time varies depending upon the kind of solvent, the washing temperature and the like, the washing is usually carried out under a pressure within the range of from 0 to 5 MPa, preferably from 0 to 1 MPa. Further, during the washing operation, stirring is preferably carried out from the viewpoint of the uniformity of washing and the washing efficiency. The solid catalyst component thus obtained can be stored in the dried state, or in an inert solvent such as hydrocarbons.

[III] Polymerization

Specifically, the above-mentioned solid catalyst component (A) and organoaluminum (B) are added to a polymerization system as catalyst components. Then, ethylene, or ethylene and α-olefin is introduced therein. The α-olefin used in ethylene copolymerization is represented by the following formula (III):

$$R^3-CH=CH_2 \quad (III)$$

$R^3$ is a hydrocarbon and the hydrocarbon group may be saturated or unsaturated, may be linear or branched, or may be cyclic. Specific examples of the α-olefin include propylene, 1-butene, 1-pentene, 1-hexene, 1-heptene, 1-octene, 1-decene, 3-methyl-1-pentene, 4-methyl-1-pentene, vinylcyclohexane, butadiene, isoprene, piperylene, and the like. Among olefins, 1-butene, 1-pentene, 1-hexene, 1-heptene, 1-octene and 1-decene are preferred. These α-olefins may be used individually, or two or more thereof may be used in combination. The amount of α-olefin is usually introduced in an amount within a range of from 0.2 to 5 wt % relative to ethylene.

The polymerization method and type of the olefin polymerization is not especially limited, and any one of solution polymerization, suspension polymerization and gas phase polymerization can be employed. Further, any one of a batch polymerization and a continuous polymerization can be employed, and there can be employed two-step polymerization or multi-step polymerization that is carried out under different conditions.

The amount of the catalyst component is not particularly limited, when solution polymerization or suspension polymerization is employed, the solid catalyst component (A) is used in such an amount that the titanium atom amount per liter of a reaction volume is generally in the range of 0.00005 to 1 mmole. The organoaluminum compound (B) is used in such an amount that the aluminum/titanium atomic ratio is generally in the range of from 5 to 1,000, preferably from 15 to 200. Alternatively, after the catalyst components (A) and (B) used in the invention are mixed in the predetermined ratio and brought into contact, ethylene and an olefin may be polymerized at once, or the catalyst components are subjected to maturation for approximately from 0.2 to 3 hours after contact operation, then, ethylene and an olefin may be polymerized. The ethylene pressure of reaction system is generally from atmospheric pressure to 10 MPa, preferably from 0.5 to 5 MPa. The reaction temperature is generally from 20 to 200° C., preferably from 50 to 150° C. The reaction time is generally from 5 minutes to 10 hours, preferably from 30 minutes to 5 hours. Although the molecular weight can be controlled by polymerization conditions including a polymerization temperature, concentration of catalyst and molar ratio of catalyst, it is effectively controlled in the presence of hydrogen.

The invention will be specifically explained with reference to Examples, while the invention shall not be limited to Examples. The characteristics of the magnesium compound (support) and polymer were evaluated according to the following methods.

(1) $D_{50}$ of Magnesium Compound

A magnesium compound was suspended in a hydrocarbon, and in this state, the magnesium compound was measured for particle diameters by a light scattering method. A particle diameter distribution determined by the measurement was plotted on a logarithmic normal probability paper, and a 50% particle diameter was taken as $D_{50}$.

(2) Particle Size Distribution Index (P) of Magnesium Compound

By using the 10% particle diameter ($D_{10}$) and 90% particle diameter ($D_{90}$) obtained by the same method as in the above-mentioned (1), the particle size distribution index was calculated from the following expression (1).

$$P=(D_{90}/D_{10}) \quad (1)$$

(3) Smoothness (Sm) of Magnesium Compound

A photograph of a dried magnesium compound was taken using a scanning electron microscope (trade name: JSM-25SIII, product of JEOL) of 300 magnifications at an acceleration voltage of 5 KV, to obtain a negative. Then, the negative was image-processed by a transmission method. Particles equivalent to 20 pixels (one pixel covering a 1.389 μm×1.389 μm area) or smaller in area were cut, and the image processing was carried out with an image analyzer (Nexsus Co., Ltd.) with respect to approximately 2,000 particles remaining. In a projected view of a particle, an ellipse having an area equal to the projected area of the particle and similar to the particle was superposed on the particle and the ellipse was approximated such that the sum total of areas inside and outside the outline of the ellipse among the areas of parts defined by the outlines of the ellipse and the particle was the smallest. Circumferential lengths $L^1$ of the particle and circumferential lengths $L^2$ of the ellipse were determined, and the smoothness was calculated on the basis of the following expression (2).

$$Sm=(L^1/L^2)^3 \quad (2)$$

where $L^1$ is a circumferential length of a projection view of a magnesium compound particle determined by photographing with a scanning electron microscope and thereafter an image-processing, and $L^2$ is a circumferential length of an ellipse which has an area equal to the projection area of the magnesium compound particle and which is approximated to the outline of the magnesium compound particle such that when the magnesium compound particle is wrapped over the ellipse, the sum of the areas inside and outside the outline of the ellipse among the sections surrounded by the outline of the magnesium compound particle and the outline of the ellipse becomes minimum.

(4) n in $Mg(OC_2H_5)_{2-n}(OR)_n$

A 1.2N hydrochloric acid aqueous solution was added to a support, the mixture was stirred at room temperature for 24 hours to decompose the support, and a corresponding alcohol amount was quantitatively determined by gas chromatography to determine n.

(5) $D_{50}'$ of Polymer Powder

The particle size distribution of polymer powder measured with standard sieves was plotted on a logarithmic normal probability paper, and a 50% particle diameter was taken as $D_{50}'$.

(6) Particle Size Distribution Index (P') of Polymer Powder

Using a 10% particle diameter ($D_{10}'$) and a 90% particle diameter ($D_{90}'$) obtained by the same method as in the above-mentioned (5), the particle size distribution index was calculated from the following expression (3).

$$P'=(D_{90}'/D_{10}') \quad (3)$$

As the amount of fine powder is large, the value of P becomes large.

(7) Amount of Fine Polymer Powder ($\leqq 50$ μm)

In the particle size distribution obtained in the above-mentioned (5), the weight of powder having a particle diameter of 50 μm or less was taken as the amount of fine powder.

(8) Smoothness of Polymer Powder (Sm')

A photograph of a polymer powder was taken with a polarization microscope (trade name: BHS-751P, supplied by Olympus Corporation) of 150 magnifications and image-processed. Particles equivalent to 20 pixels (one pixel being to cover a 0.0813 mm×0.0813 mm area) or smaller in area were cut, and the image processing was carried out with an image analyzer (supplied by Nexsus Co., Ltd.) with regard to approximately 2,000 particles remaining. In a projected view of a polymer powder, an ellipse having an area equal to the projected area of the polymer powder and similar to the polymer powder was superposed on the, polymer powder and the ellipse was approximated such that the sum total of areas inside and outside the outline of the ellipse among the areas of parts defined by the outlines of the ellipse and the polymer powder was the smallest. Circumferential lengths $L^3$ of the polymer powder and circumferential lengths $L^4$ of the ellipse were determined, and the smoothness was calculated on the basis of the following expression (4).

$$Sm'=(L^3/L^4)^3 \quad (4)$$

where $L^3$ is a circumferential length of a projection view of a polymer powder determined by photographing with a scanning electron microscope and thereafter an image-processing, and $L^4$ is a circumferential length of an ellipse which has an area equal to the projection area of the polymer powder and which is approximated to the outline of the particle such that when the particle is wrapped over the ellipse, the sum of the areas inside and outside the outline of the ellipse among the sections surrounded by the outline of the particle and the outline of the ellipse becomes minimum.

(9) Apparent Density (AD)

Measured according to JIS K6721.

(10) Angle of Repose

A predetermined amount of a sample was caused to drop on a disk, a measurement line was brought into line with the angle of a pile and measured for the angle with a turn table type repose angle measuring apparatus, and the angle was taken as an angle of repose.

The angle of repose means that the smaller that value thereof is, the superior the flowability of a polymer powder is.

(11) Fish Eye

A polymer obtained was dried and was formed to a film by an inflation forming method (thickness: 6 μm, blow ratio: 1.5). Three films of 10×10 cm were obtained as samples from the film and the total number of fish eyes were visually counted for evaluation.

(12) Melt Index (MI) (g/10 Minutes)

Measured at a temperature of 190° C. under a load of 2,160 g according to JIS K7210.

Example 1

(1) Preparation of Magnesium Compound

A reactor with max blend wing having an internal volume of 1 liter was flushed with nitrogen, and 608 ml (10.4 mole) of dehydrated ethanol, 67.7 ml (0.74 mole) of n-butanol, 0.18 g (1.4 milligram atom) of iodine and 36.0 g (1.48 milligram atom) of metal magnesium were poured into the reactor with "MAXBLEND®" blade wing and allowed to react at a reflux temperature (30° C.) with stirring (1,000 rpm) until no more hydrogen was generated from the system, to give a magnesium compound.

(2) Preparation of Solid Catalyst Component

A three-necked flask having an internal volume of 0.5 liter and equipped with a stirrer was flushed with nitrogen, and 15 g (131 mmole) of the magnesium compound obtained in the above (1) and 350 ml of hexane were placed in the three-necked flask. 4.9 mL (43 mmole) of silicon tetrachloride and 4.9 mL (64 mmole) of isopropanol were added to the mixture with stirring and reacted at 70° C. for 2 hours. Then 36 mL (0.33 mole) of titanium tetrachloride was added and reacted at 70° C. for 6 hours, followed by washing with hexane to give a solid catalyst component.

(3) Polymerization of Ethylene

An autoclave made of stainless steel having an internal volume of 7 liter and equipped with a stirrer was fully dried and flushed with nitrogen, and 2.5 liter of dehydrated hexane was placed therein. Further, 2.5 mmole of triethylaluminum was added and the solid catalyst component prepared in the above (2) was added in an amount of 0.25 mmole in terms of Ti atom. Hydrogen was introduced up to 0.3 MPa, and then ethylene was continuously introduced so as to attain a total pressure of 0.55 MPa. Polymerization was carried out at 85° C. for 60 minutes under stirring. Then, the temperature was lowered to 40° C.

Next after adding 2.5 liter of dehydrated hexane, 0.0001 MPa of hydrogen and 20 g of 1-butene were introduced and ethylene was then introduced so as to attain the total pressure of 0.33 MPa. Polymerization was carried out at 80° C. for 30 minutes under stirring. The results are shown in Table 1.

In the table, the first activity is the activity of the first step polymerization and the first MI is the MI of polymer obtained at the first step.

Example 2

(1) Preparation of Magnesium Compound

Example 1 (1) was repeated except that 0.068 g (1.4 milligram atom) of anhydrous magnesium chloride was used instead of iodine.

(2) Preparation of Solid Catalyst Component

Example 1 (2) was repeated except that the magnesium compound prepared in the above (1) was used.

(3) Polymerization of Ethylene

Example 1 (3) was repeated except that the solid catalyst component prepared in the above (2) was used. Table 1 shows the results.

Example 3

(1) Preparation of Magnesium Compound

Example 1 (1) was repeated except that the reaction temperature was set at 50° C.

(2) Preparation of Solid Catalyst Component

Example 1 (2) was repeated except that the magnesium compound prepared in the above (1) was used.

(3) Polymerization of Ethylene

Example 1 (3) was repeated except that the solid catalyst component prepared in the above (2) was used. Table 1 shows the results.

Example 4

(1) Preparation of Magnesium Compound

A reactor with max blend wing having an internal volume of 1 liter was flushed with nitrogen, and 608 ml (10.4 mole) of dehydrated ethanol, 67.7 ml (0.74 mole) of n-butanol, 0.18 g (1.4 milligram atom) of iodine and 18.0 g (0.74 milligram atom) of metal magnesium were poured into the reactor with max blend wing and allowed to react at 40° C. with stirring (1,000 rpm) until no more hydrogen was generated from the system, to give a magnesium compound.

(2) Preparation of Solid Catalyst Component

Example 1 (2) was repeated except that the magnesium compound prepared in the above (1) was used.

(3) Polymerization of Ethylene

Example 1 (3) was repeated except that the solid catalyst prepared in the above (2) was used. Table 1 shows the results.

Example 5

(1) Preparation of Magnesium Compound

Example 1 (1) was repeated except that the reaction temperature was set at 65° C.

(2) Preparation of Solid Catalyst Component

Example 1 (2) was repeated except that the magnesium compound prepared in the above (1) was used.

(3) Polymerization of Ethylene

Example 1 (3) was repeated except that the solid catalyst component prepared in the above (2) was used. Table 1 shows the results.

Comparative Example 1

(1) Preparation of Magnesium Compound

A reactor with max blend wing having an internal volume of 1 liter was flushed with nitrogen, and 695 ml (11.8 mole) of dehydrated ethanol (EtOH), 1.8 g (14 milligram atom) of iodine and 36.0 g (1.48 milligram atom) of metal magnesium were poured into the reactor with max blend wing and allowed to react at a reflux temperature (78° C.) with stirring (330 rpm) until no more hydrogen was generated from the system, to give a solid product. 25 g of the fully dried solid product and 200 ml of hexane were placed in a ball mill with an internal volume of 400 ml and 100 balls made of stainless steel having a diameter of 1.2 cm. They were then pulverized for ten hours to give a magnesium compound.

(2) Preparation of Solid Catalyst Component

Example 1 (2) was repeated except that the magnesium compound prepared in the above (1) was used.

(3) Polymerization of Ethylene

Example 1 (3) was repeated except that the solid catalyst component prepared in the above (2) was used. Table 1 shows the results.

Comparative Example 2

(1) Preparation of Magnesium Compound

A reactor with max blend wing having an internal volume of 1 liter was flushed with nitrogen, and 521 ml (8.89 mole) of dehydrated ethanol (EtOH), 271 ml (2.96 mole) of n-butanol, 3.6 g (2.8 milligram atom) of iodine and 36.0 g (1.48 milligram atom) of metal magnesium were poured into the reactor with max blend wing and allowed to react at a reflux temperature (79° C.) with stirring (330 rpm) until no more hydrogen was generated from the system, to give a solid product. 25 g of the fully dried solid product and 200 ml of hexane were placed in a ball mill with an internal volume of 400 ml and 100 balls made of stainless steel having a diameter of 1.2 cm. They were then pulverized for 2 hours to give a magnesium compound.

(2) Preparation of Solid Catalyst Component

Example 1 (2) was repeated except that the magnesium compound prepared in the above (1) was used.

(3) Polymerization of Ethylene

Example 1 (3) was repeated except that the solid catalyst prepared in the above (2) was used. Table 1 shows the results.

TABLE 1

| | Index | Unit | Example 1 | Example 2 | Example 3 | Example 4 | Example 5 | Comparative Example 1 | Comparative Example 2 |
|---|---|---|---|---|---|---|---|---|---|
| Support | EtOH/Mg | (molar ratio) | 7.50 | 7.50 | 7.50 | 15.00 | 7.50 | 8.00 | 6.00 |
| | BuOH/Mg | (molar ratio) | 0.50 | 0.50 | 0.50 | 1.00 | 0.50 | 0.00 | 2.00 |
| | n: $Mg(OEt)_{2-n}(OBu)_n$ | | 0.10 | 0.10 | 0.12 | 0.11 | 0.13 | 0.00 | 0.45 |
| | Kind of halogen | | $I_2$ | $MgCl_2$ | $I_2$ | $I_2$ | $I_2$ | $I_2$ | $I_2$ |
| | $I_2$ or $MgCl_2$/Mg | (gram atom ratio) | 0.0010 | 0.0010 | 0.0010 | 0.0010 | 0.0010 | 0.010 | 0.019 |
| | Reaction temperature | (° C.) | 30 | 30 | 50 | 40 | 65 | 78 | 79 |
| | Revolution | (rpm) | 1000 | 1000 | 1000 | 1000 | 1000 | 330 | 330 |
| | Pulverization | | None | None | None | None | None | Done | Done |
| | $D_{50}$ | (μm) | 5.7 | 5.4 | 6.9 | 5.8 | 8.4 | 5.8 | 24.0 |
| | $D_{10}$ | (μm) | 3.4 | 3.1 | 4.1 | 3.5 | 4.9 | 2.6 | 7.2 |
| | $D_{90}$ | (μm) | 9.7 | 9.6 | 12.3 | 9.8 | 14.1 | 11.2 | 36.1 |
| | P | | 2.9 | 3.1 | 3.0 | 2.8 | 2.9 | 4.3 | 5.0 |
| | Sm | | 1.18 | 1.19 | 1.17 | 1.17 | 1.16 | 5.78 | 6.02 |
| Polymer | 1st Activation | (kg/g-Cat) | 40.8 | 41.1 | 38.2 | 40.4 | 33.5 | 39.8 | 15.3 |
| | 1st MI | (g/10 min) | 4000 | 3900 | 3800 | 4000 | 3600 | 4000 | 2000 |
| | Fish eyes | | 76 | 69 | 71 | 75 | 110 | 80 | 480 |
| | $D_{50}'$ | (μm) | 180 | 170 | 190 | 180 | 190 | 180 | 330 |
| | $D_{10}'$ | (μm) | 120 | 110 | 120 | 120 | 110 | 80 | 200 |
| | $D_{90}'$ | (μm) | 270 | 260 | 280 | 280 | 290 | 300 | 1520 |
| | P' | | 2.3 | 2.4 | 2.3 | 2.3 | 2.6 | 3.8 | 4.6 |
| | Amount of powder (less than 50 μm) | (wt %) | 0.2 | 0.3 | 0.2 | 0.2 | 0.2 | 1.8 | 1.2 |
| | AD | (g/ml) | 0.32 | 0.33 | 0.31 | 0.32 | 0.30 | 0.28 | 0.26 |
| | Sm' | | 1.16 | 1.17 | 1.15 | 1.16 | 1.15 | 5.05 | 5.21 |
| | Angle of repose | (°) | 39 | 40 | 39 | 39 | 40 | 45 | 46 |

INDUSTRIAL UTILITY

The magnesium compound of the invention is useful as a support for a solid catalyst component for ethylene polymerization and can be used for ethylene polymer production as a material of a catalyst for ethylene polymerization.

The invention claimed is:

1. A magnesium composition, comprising a compound represented by the formula (I):

$$Mg(OC_2H_5)_{2-n}(OR^1)_n \quad (I)$$

where n is a numerical value satisfying 0<n<0.35, $R^1$ is $C_mH_{2m+1}$, and m is an integer of from 3 to 10;
wherein:
the composition has a particle diameter $D_{50}$ corresponding to 50% of a cumulative weight fraction of from 4 to 20 μm;
the composition has a particle size distribution index (P) of less than 4.0, where P is given by the formula (1):

$$P=(D_{90}/D_{10}) \quad (1)$$

where $D_{90}$ is a particle diameter corresponding to 90% of cumulative weight fraction, and $D_{10}$ is a particle diameter corresponding to 10% of cumulative weight fraction; and
the composition is obtained by reacting metal magnesium, ethanol, an alcohol having from 3 to 10 carbon atoms, and at least one of a halogen and a halogen-containing compound at a temperature of from 0 to 70° C., the at least one of the halogen and the halogen-containing compound providing at least 0.0001 gram atoms of the halogen relative to one gram atom of the metal magnesium.

2. The magnesium composition according to claim 1, wherein the alcohol having from 3 to 10 carbon atoms is n-butanol.

3. The magnesium composition according to claim 1, wherein n is a numeral value of from 0.005 to 0.3.

4. A solid catalyst component for ethylene polymerization obtained by reacting the following components (a) and (b):

(a) the magnesium composition according to claim 1; and
(b) a titanium compound represented by the formula (II):

$$Ti(OR^2)_sX_{4-s} \quad (II)$$

where X is a halogen atom, $R^2$ is a hydrocarbon group having from 1 to 10 carbon atoms, $R^2$s may be the same or different, and s is an integer of from 0 to 4.

5. The solid catalyst component according to claim 4, wherein the solid catalyst component is obtained by reacting a halogen compound (c) with components (a) and (b).

6. The solid catalyst component according to claim 5, wherein the solid catalyst component is obtained by reacting an alcohol (d) with components (a), (b) and (c).

7. A catalyst for ethylene polymerization, comprising the following components (A) and (B):

(A) the solid catalyst component according to claim 4; and
(B) an organoaluminum compound.

8. A method of producing an ethylene homopolymer or a copolymer of ethylene and an α-olefin, comprising polymerizing in the presence of the catalyst according to claim 7.

9. A method of producing a magnesium composition, comprising:
reacting metal magnesium, ethanol, an alcohol having from 3 to 10 carbon atoms and at least one of a halogen and a halogen-containing compound at a temperature of from 0 to 70° C.;
wherein:
the at least one of the halogen and the halogen-containing compound is present in an amount sufficient to provide at least 0.0001 gram atoms of the halogen relative to one gram atom of the metal magnesium;
the magnesium composition comprises a compound represented by the formula (I):

$$Mg(OC_2H_5)_{2-n}(OR^1)_n \quad (I)$$

where n is a numerical value satisfying 0<n<0.35, $R^1$ is $C_mH_{2m+1}$, and m is an integer of from 3 to 10;

the composition has a particle diameter $D_{50}$ corresponding to 50% of a cumulative weight fraction of from 4 to 20 µm; and the composition has a particle size distribution index (P) of less than 4.0, where P is given the formula (1) of P<4.0:

$$P=(D_{90}/D_{10}) \quad (1)$$

where $D_{90}$ is a particle diameter corresponding to 90% of cumulative weight fraction, and $D_{10}$ is a particle diameter corresponding to 10% of cumulative weight fraction.

* * * * *